US011845564B1

(12) United States Patent
Umar (10) Patent No.: US 11,845,564 B1
(45) Date of Patent: Dec. 19, 2023

(54) AIRCRAFT SEATBELT BUCKLE FASTEN INDICATION SYSTEM

(71) Applicant: Isah Umar, Lanham, MD (US)

(72) Inventor: Isah Umar, Lanham, MD (US)

( * ) Notice: Subject to any disclaimer, the term of this patent is extended or adjusted under 35 U.S.C. 154(b) by 409 days.

(21) Appl. No.: 17/347,659

(22) Filed: Jun. 15, 2021

(51) Int. Cl.
*B64D 45/00* (2006.01)
*B64D 11/06* (2006.01)

(52) U.S. Cl.
CPC ............ *B64D 45/00* (2013.01); *B64D 11/062* (2014.12)

(58) Field of Classification Search
CPC .............................. B64D 45/00; B64D 11/062
USPC ............................................................ 701/3
See application file for complete search history.

(56) References Cited

U.S. PATENT DOCUMENTS

| 6,059,066 | A | 5/2000 | Lary |
| 6,448,907 | B1 * | 9/2002 | Naclerio ............ B64D 45/0059 |
| | | | 280/801.1 |
| 6,545,597 | B1 | 4/2003 | Blount |
| 6,888,475 | B2 * | 5/2005 | Darr ................... B64D 45/0044 |
| | | | 340/438 |
| 7,812,716 | B1 | 10/2010 | Cotter |
| 8,005,595 | B2 * | 8/2011 | Marriott ............ B60R 21/01546 |
| | | | 280/801.1 |
| 8,090,504 | B2 | 1/2012 | Long |
| 9,908,625 | B2 * | 3/2018 | Goyal ..................... B60R 22/48 |
| 11,318,910 | B2 * | 5/2022 | Moffa ..................... B60N 2/242 |
| 11,465,746 | B2 * | 10/2022 | Johnson ............ B60R 21/01544 |
| 2017/0334440 | A1 * | 11/2017 | Myers ............... B60W 30/0953 |
| 2018/0297470 | A1 * | 10/2018 | Kim ....................... B60Q 1/085 |
| 2019/0308524 | A1 * | 10/2019 | Kominato ................ H01Q 1/32 |

FOREIGN PATENT DOCUMENTS

WO 03063105 7/2003

* cited by examiner

*Primary Examiner* — Muhammad Shafi
(74) *Attorney, Agent, or Firm* — Kyle A. Fletcher, Esq.

(57) ABSTRACT

The aircraft seatbelt buckle fasten indication system comprises a monitoring circuit, a plurality of tracking structures, a plurality of lap belts, and a plurality of vehicle seats. Each of the plurality of tracking structures attaches to a lap belt selected from the plurality of lap belts. Each individual tracking structure selected from the plurality of tracking structures attaches to a lap belt selected from the plurality of lap belts such that the selected individual tracking structure monitors the status of the lap belt. The status of the lap belt is selected from the group consisting of: a) the lap belt is properly fastened; and, b) the lap belt is not properly fastened. The monitoring circuit monitors each of the plurality of tracking structures to individually determine the status of each individual lap belt. The monitoring circuit provides a visual display of the status of each individual lap belt.

13 Claims, 4 Drawing Sheets

AIRCRAFT SEATBELT BUCKLE FASTEN INDICATION SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation including safety and body harnesses in vehicles, more specifically, an alarms for indicating the incorrect application of a belt or harness. (B60R22/48)

SUMMARY OF INVENTION

The aircraft seatbelt buckle fasten indication system is an alarm system. The aircraft seatbelt buckle fasten indication system comprises a monitoring circuit, a plurality of tracking structures, a plurality of lap belts, and a plurality of vehicle seats.

Each of the plurality of vehicle seats is a seat that is mounted in the vehicle. Each of the plurality of vehicle seats is adapted to allow a passenger of the vehicle to sit within the vehicle. There is a one to one correspondence between the plurality of vehicle seats and the plurality of lap belts such that an individual lap belt selected from the plurality of lap belts attaches to an individual vehicle seat selected from the plurality of vehicle seats. Each individual lap belt selected from the plurality of lap belts is a harness that secures the passenger to the associated individual vehicle seat selected from the plurality of vehicle seats.

Each of the plurality of tracking structures attaches to an individual lap belt selected from the plurality of lap belts. There is a one to one correspondence between the plurality of tracking structures and the plurality of lap belts. Each individual tracking structure selected from the plurality of tracking structures attaches to an individual lap belt selected from the plurality of lap belts such that the selected individual tracking structure monitors the status of the individual lap belt. The status of the individual lap belt is selected from the group consisting of: a) the individual lap belt is properly fastened; and, b) the individual lap belt is not properly fastened. The monitoring circuit monitors each of the plurality of tracking structures to individually determine the status of each individual lap belt. The monitoring circuit provides a visual display of the status of each individual lap belt.

These together with additional objects, features and advantages of the aircraft seatbelt buckle fasten indication system will be readily apparent to those of ordinary skill in the art upon reading the following detailed description of the presently preferred, but nonetheless illustrative, embodiments when taken in conjunction with the accompanying drawings.

In this respect, before explaining the current embodiments of the aircraft seatbelt buckle fasten indication system in detail, it is to be understood that the aircraft seatbelt buckle fasten indication system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the aircraft seatbelt buckle fasten indication system.

It is therefore important that the claims be regarded as including such equivalent construction insofar as they do not depart from the spirit and scope of the aircraft seatbelt buckle fasten indication system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
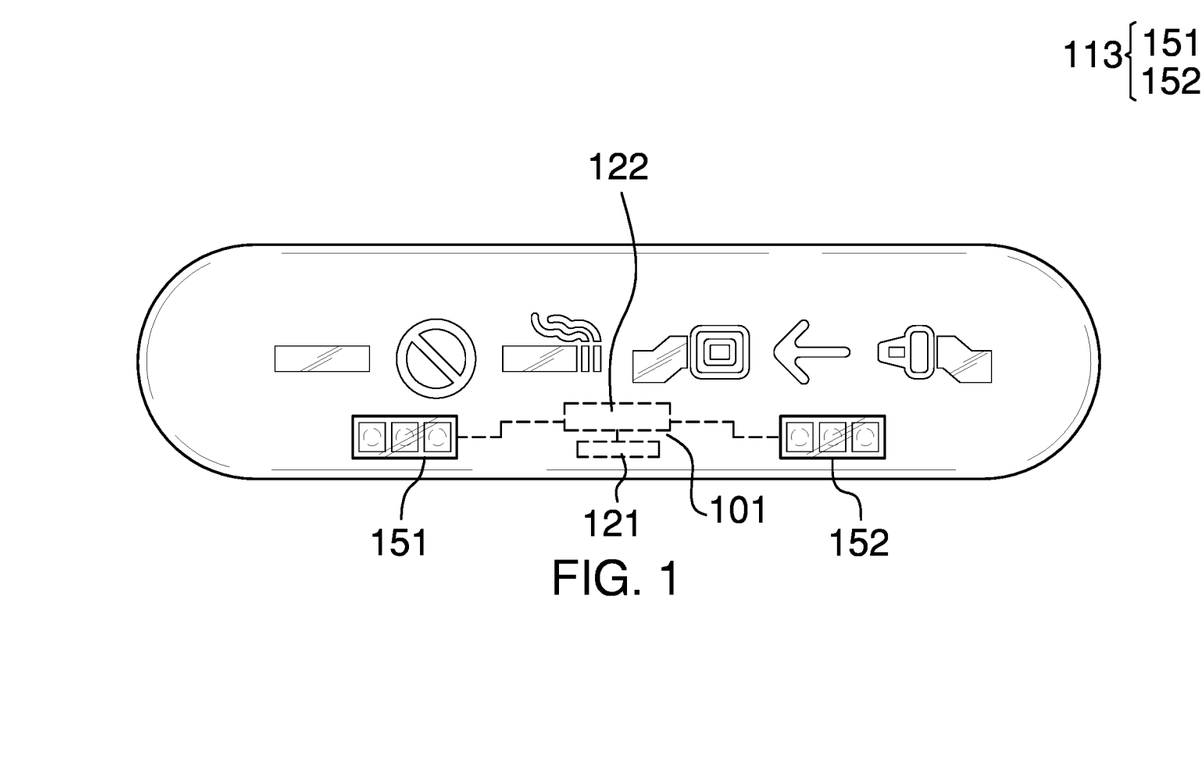
FIG. 1 is a front view of an embodiment of the disclosure.
Figure 2:
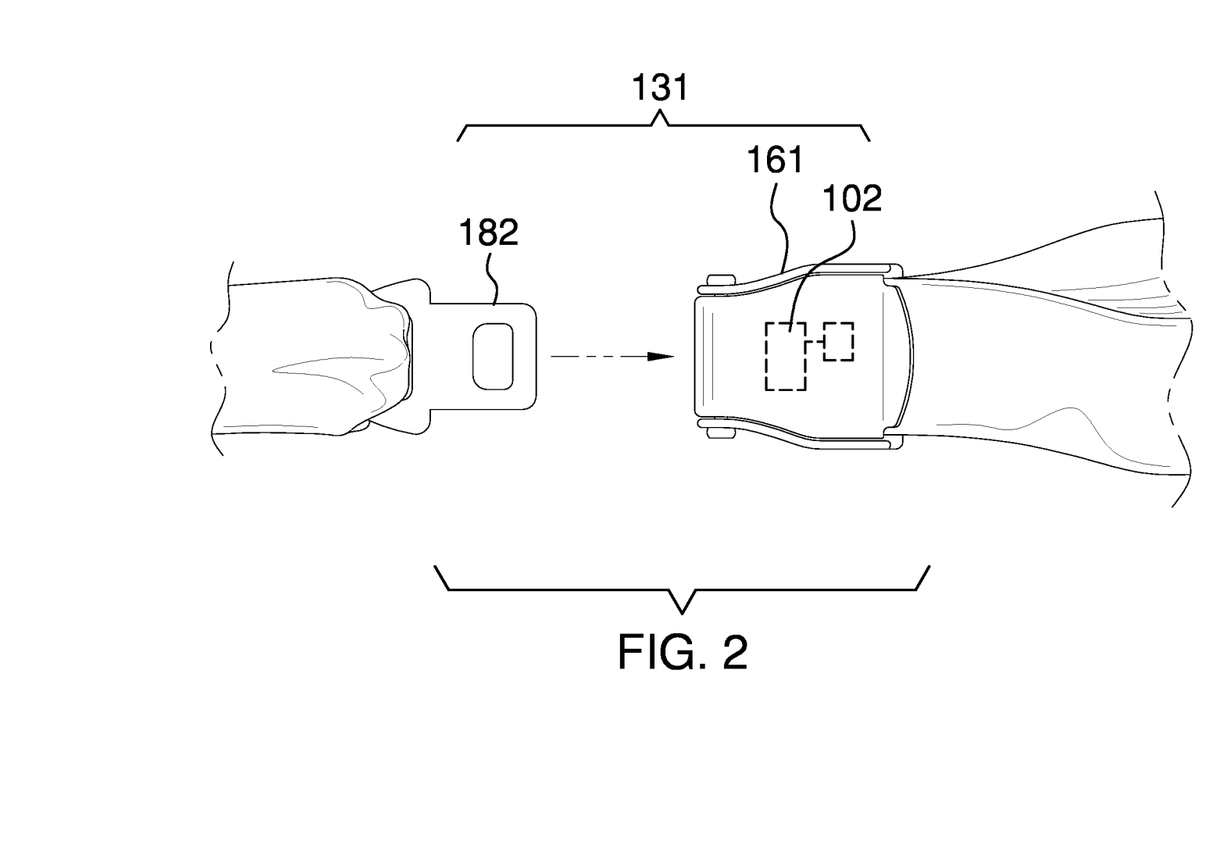
FIG. 2 is a detail view of an embodiment of the disclosure.
Figure 3:
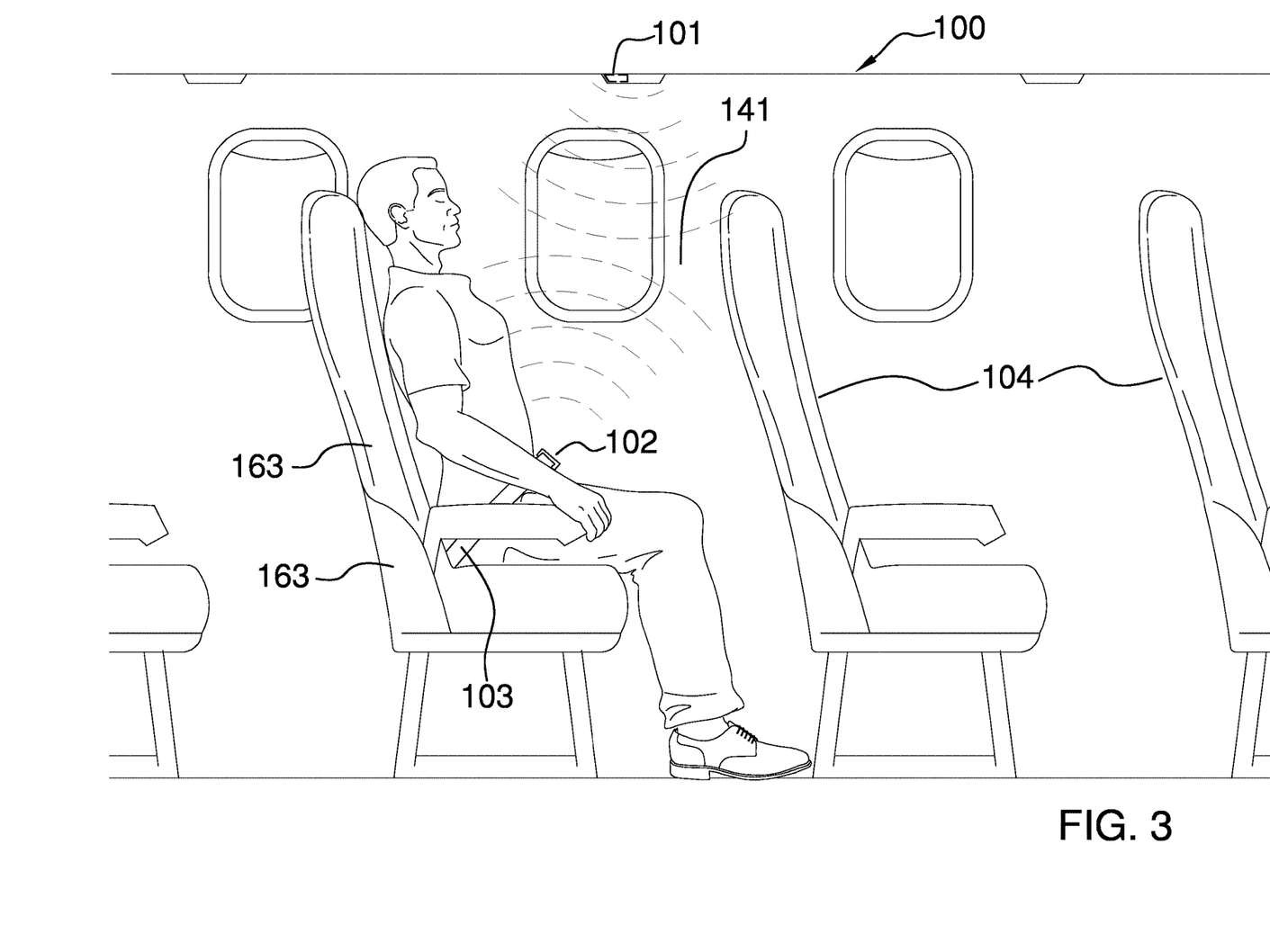
FIG. 3 is an in-use view of an embodiment of the disclosure.
Figure 4:
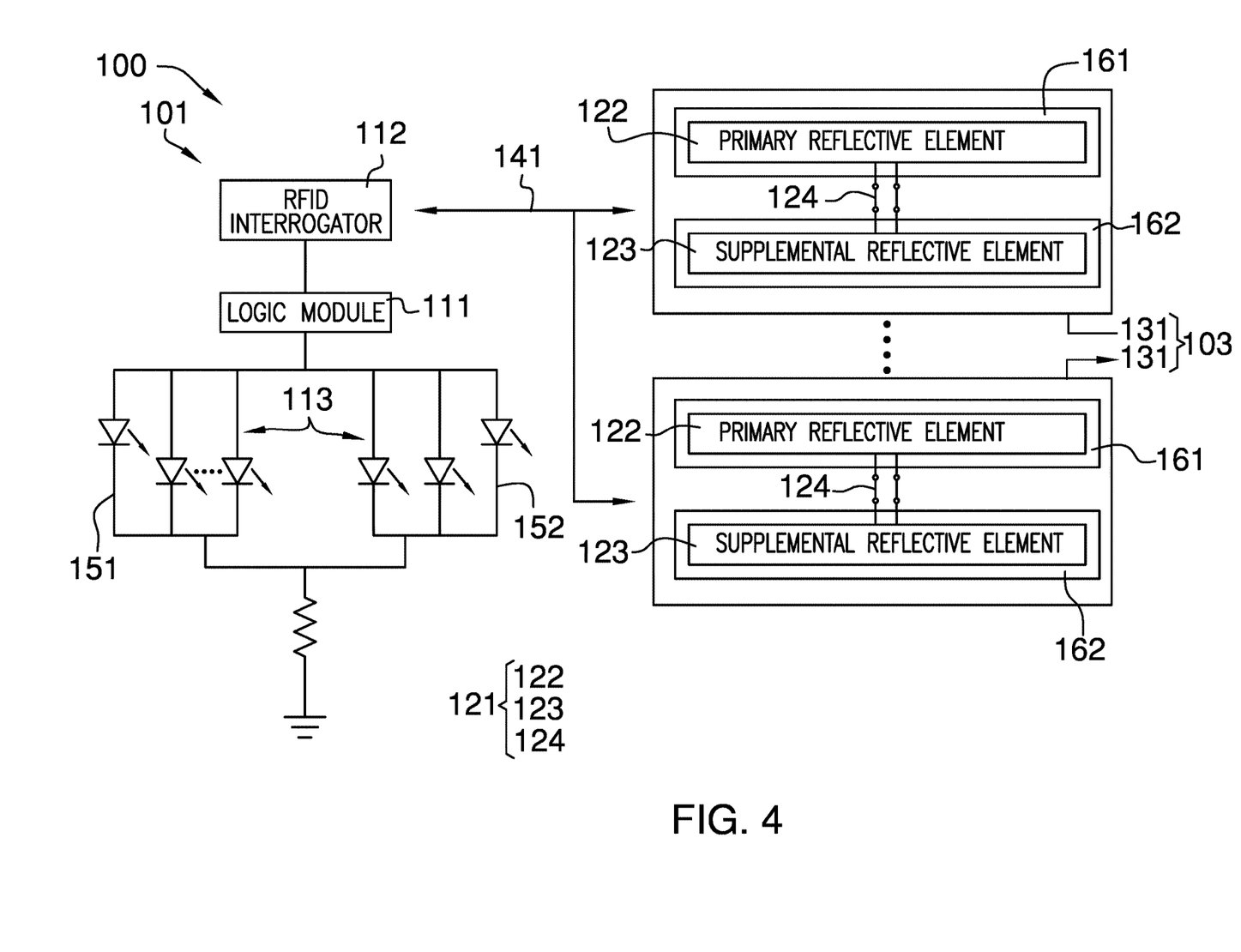
FIG. 4 is a schematic view of an embodiment of the disclosure.

Detailed reference will now be made to one or more potential embodiments of the disclosure, which are illustrated in FIGS. 1 through 4.

The aircraft seatbelt buckle fasten indication system 100 (hereinafter invention) is an alarm system. The invention 100 comprises a monitoring circuit 101, a plurality of tracking structures 102, a plurality of lap belts 103, and a plurality of vehicle seats 104.

Each of the plurality of vehicle seats 104 is a seat that is mounted in the vehicle. Each of the plurality of vehicle seats 104 is adapted to allow a passenger of the vehicle to sit within the vehicle. There is a one to one correspondence between the plurality of vehicle seats 104 and the plurality of lap belts 103 such that an individual lap belt 131 selected from the plurality of lap belts 103 attaches to an individual vehicle seat 163 selected from the plurality of vehicle seats 104. Each individual lap belt 131 selected from the plurality of lap belts 103 is a harness that secures the passenger to the associated individual vehicle seat 163 selected from the plurality of vehicle seats 104.

Each of the plurality of tracking structures 102 attaches to an individual lap belt 131 selected from the plurality of lap belts 103. There is a one to one correspondence between the plurality of tracking structures 102 and the plurality of lap belts 103. Each individual tracking structure 121 selected from the plurality of tracking structures 102 attaches to an individual lap belt 131 selected from the plurality of lap belts 103 such that the selected individual tracking structure 121 monitors the status of the individual lap belt 131. The status of the individual lap belt 131 is selected from the group consisting of: a) the individual lap belt 131 is properly fastened; and, b) the individual lap belt 131 is not properly fastened. The monitoring circuit 101 monitors each of the plurality of tracking structures 102 to individually determine the status of each individual lap belt 131. The monitoring circuit 101 provides a visual display of the status of each individual lap belt 131.

Each of the plurality of vehicle seats 104 is a seat that is mounted in a vehicle. The plurality of vehicle seats 104 comprises a collection of individual vehicle seats 163. The individual vehicle seat 163 is a seat that is mounted in a fixed position within a vehicle. The plurality of lap belts 103 comprises a collection of individual lap belts 131. Each individual lap belt 131 selected from the plurality of lap belts 103 attaches to an individual vehicle seat 163 selected from the plurality of vehicle seats 104. There is a one to one correspondence between each individual vehicle seat 163 selected from the plurality of vehicle seats 104 and each individual lap belt 131 selected from the plurality of lap belts 103.

Each individual lap belt 131 forms a harness that secures a passenger into the individual vehicle seat 163 selected from the plurality of vehicle seats 104 that is associated with the individual lap belt 131. The individual lap belt 131 is the two point harness version of a seat belt. The seat belt and the lap belt are defined elsewhere in this disclosure. Each individual lap belt 131 selected from the plurality of lap belts 103 is associated with an individual vehicle seat 163 associated with the plurality of vehicle seats 104. Each individual lap belt 131 comprises a first lap belt connector 161 and a second lap belt connector 162.

The first lap belt connector 161 is a first connector of the seat belt buckle of the individual lap belt 131. The second lap belt connector 162 is a second connector of the seat belt buckle of the individual lap belt 131. The buckle and the seat belt are defined elsewhere in this disclosure. The first lap belt connector 161 is fastened to the second lap belt connector 162 to properly fasten the individual lap belt 131. By properly fastening the individual lap belt 131 is meant that a passenger is properly secured to the individual vehicle seat 163.

The monitoring circuit 101 is an electric circuit. The monitoring circuit 101 is a radio frequency identification (RFID) circuit. The RFID structure is defined elsewhere in this disclosure. The monitoring circuit 101 is an active electric circuit. The monitoring circuit 101 forms an interrogation communication link 141 with each of the plurality of tracking structures 102. The monitoring circuit 101 transmits an interrogation signal using the interrogation communication link 141 to each of the plurality of tracking structures 102.

The monitoring circuit 101 receives a response to the interrogation signal from each of the plurality of tracking structures 102 over the interrogation communication link 141. The monitoring circuit 101 determines the status of each of the individual tracking structure 121 selected from the plurality of tracking structures 102 from the response to the interrogation signal received from each individual tracking structure 121. The monitoring circuit 101 visibly displays the status of each individual tracking structure 121 selected from the plurality of tracking structures 102.

The monitoring circuit 101 comprises a logic module 111, an RFID interrogator 112, and a plurality of signaling LEDs 113. The logic module 111, the RFID interrogator 112, and the plurality of signaling LEDs 113 are electrically interconnected.

The logic module 111 is a programmable electric circuit. The logic module 111 controls the operation of the RFID interrogator 112. The logic module 111 monitors the interrogation signal responses received by the RFID interrogator 112 from each of the plurality of tracking structures 102 to determine the fastening status of each individual tracking structure 121. The logic module 111 individually controls the illumination of each LED selected from the plurality of signaling LEDs 113. The logic module 111 visibly displays the fastening status of each individual tracking structure 121 selected from the plurality of tracking structures 102 using the plurality of signaling LEDs 113.

The RFID interrogator 112 is an electric circuit. The RFID interrogator 112 further comprises an interrogation communication link 141. The interrogation communication link 141 refers to the set of radio frequency communications that occur between the plurality of lap belts 103 and the monitoring circuit 101. The interrogation communication link 141 includes the transmission of the interrogation signal from the monitoring circuit 101 to the plurality of tracking structures 102. The interrogation communication link 141 further includes the reflection of the interrogation signal, in the form of the modified reflection, from each individual tracking structure 121 selected from the plurality of tracking structures 102 back to the monitoring circuit 101.

The RFID interrogator 112 transmits a radio frequency interrogation signal to each individual tracking structure 121 selected from the plurality of tracking structures 102. The RFID interrogator 112 receives the modified reflection of the transmitted interrogation signal from each of the individual tracking structures 121. The RFID interrogator 112 extracts the identification information from the modified reflection received from each individual tracking structure 121. The RFID interrogator 112 extracts from the modified reflection received from each individual tracking structure 121 the fastening status of the individual lap belt 131 associated with the individual tracking structure 121. The RFID interrogator 112 forwards the extracted identification information and the extracted fastening status received from each individual tracking structure 121 to the logic module 111 for further processing. The logic module 111 uses the extracted identification information and the extracted fastening status received from each individual tracking structure 121 to determine the status of each LED contained in the plurality of signaling LEDs 113.

Each of the plurality of signaling LEDs 113 is an LED. The operation of each signaling LED selected from the plurality of signaling LEDs 113 is independently controlled by the logic module 111. The plurality of signaling LEDs 113 displays the status of each individual tracking structure 121 selected from the plurality of tracking structures 102. For each individual tracking structure 121 selected from the plurality of tracking structures 102, the plurality of signaling LEDs 113 generates a first visible illumination that is uniquely identified with the selected individual tracking structure 121 indicating that the selected individual lap belt 131 is not properly fastened. For each plurality of signaling LEDs 113 selected from the plurality of tracking structures 102, the plurality of signaling LEDs 113 generates a second visible illumination that is uniquely identified with the selected individual tracking structure 121 indicating that the selected individual lap belt 131 is properly fastened.

The plurality of signaling LEDs 113 further comprises a plurality of latched signal LEDs 151 and a plurality of uncoupled signal LEDs 152.

Each of the plurality of latched signal LEDs 151 is a LED. Each of the plurality of latched signal LEDs 151 is identical. There is a one to one correspondence between each of the plurality of latched signal LEDs 151 and the plurality of tracking structures 102 such that each latched signal LED selected from the plurality of latched signal LEDs 151 is associated with an individual tracking structure 121 selected from the plurality of tracking structures 102. Each of the plurality of latched signal LEDs 151 are visibly displayed within the interior space of the vehicle. The logic module 111 controls the operation of each of the plurality of latched signal LEDs 151.

Specifically, when the RFID interrogator 112 indicates to the logic module 111 that an individual tracking structure 121 is indicating that its associated individual lap belt 131 is properly fastened, the logic module 111 illuminates the latched signal LED selected from the plurality of latched signal LEDs 151 that is associated with the individual tracking structure 121. When the RFID interrogator 112 indicates to the logic module 111 that an individual tracking structure 121 is indicating that its associated individual lap belt 131 is not properly fastened, the logic module 111 extinguishes the illumination of the latched signal LED selected from the plurality of latched signal LEDs 151 that is associated with the individual tracking structure 121.

Each of the plurality of uncoupled signal LEDs 152 is a LED. Each of the plurality of uncoupled signal LEDs 152 is identical. The color of the light generated by each of the plurality of uncoupled signal LEDs 152 is different from the light generated by the plurality of latched signal LEDs 151. There is a one to one correspondence between each of the plurality of uncoupled signal LEDs 152 and the plurality of tracking structures 102 such that each latched signal LED selected from the plurality of uncoupled signal LEDs 152 is associated with an individual tracking structure 121 selected from the plurality of tracking structures 102. Each of the plurality of uncoupled signal LEDs 152 are visibly displayed within the interior space of the vehicle. The logic module 111 controls the operation of each of the plurality of uncoupled signal LEDs 152.

Specifically, when the RFID interrogator 112 indicates to the logic module 111 that an individual tracking structure 121 is indicating that its associated individual lap belt 131 is not properly fastened, the logic module 111 illuminates the uncoupled signal LED selected from the plurality of uncoupled signal LEDs 152 that is associated with the individual tracking structure 121. Specifically, when the RFID interrogator 112 indicates to the logic module 111 that an individual tracking structure 121 is indicating that its associated individual lap belt 131 is properly fastened, the logic module 111 extinguishes the illumination of the uncoupled signal LED selected from the plurality of uncoupled signal LEDs 152 that is associated with the individual tracking structure 121.

Each of the plurality of tracking structures 102 is a passive electric circuit. There is a one to one correspondence between each individual tracking structure 121 selected from the plurality of tracking structures 102 and each individual lap belt 131 selected from the plurality of lap belts 103. Each individual tracking structure 121 selected from the plurality of tracking structures 102 mounts into the associated individual lap belt 131 selected from the plurality of lap belts 103. Each of the plurality of tracking structures 102 forms an RFID tracking tag. The RFID tracking tag is defined elsewhere in this disclosure.

Each of the plurality of tracking structures 102 generates a modified reflection of the interrogation signal generated by the monitoring circuit 101. The modified reflection of the interrogation signal that is returned by each plurality of tracking structures 102 of the individual tracking structure 121 to the monitoring circuit 101 uniquely identifies the individual tracking structure 121. The modified reflection of the interrogation signal that is returned by each plurality of tracking structures 102 of the individual tracking structure 121 to the monitoring circuit 101 transmits the fastening status of the associated individual lap belt 131 to the monitoring circuit 101.

The plurality of tracking structures 102 comprises a collection of individual tracking structure 121.

The individual tracking structure 121 is a passive RFID tracking tag. The RFID tracking tag is defined elsewhere in this disclosure. The individual tracking structure 121 reflects a modified reflection of the interrogation signal received from the monitoring circuit 101 back to the monitoring circuit 101 over the interrogation communication link 141. The modified reflection that is reflected by the individual tracking structure 121 transmits information that uniquely identifies the individual tracking structure 121 to the RFID interrogator 112 of the monitoring circuit 101. The modified reflection that is reflected by the individual tracking structure 121 transmits information regarding the fastening status of the individual lap belt 131 associated with the individual tracking structure 121. The individual tracking structure 121 transmits a first modified reflection to the monitoring circuit 101 when the individual lap belt 131 is not properly fastened. The individual tracking structure 121 transmits a second modified reflection to the monitoring circuit 101 when the individual lap belt 131 is properly fastened.

Each individual tracking structure 121 selected from the plurality of tracking structures 102 comprises a primary RFID reflective element 122, a supplemental RFID reflective element 123, and an electrical connector 124. The electrical connector 124 electrically connects the primary RFID reflective element 122 to the supplemental RFID reflective element 123.

The primary RFID reflective element 122 forms a primary RFID tracking tag that can operate independently of the supplemental RFID reflective element 123. The primary RFID reflective element 122 is a passive electric structure. The primary RFID reflective element 122 generates a modified reflection of the interrogation signal generated by individual tracking structure 121 that is independent of the supplemental RFID reflective element 123 when the individual lap belt 131 is not properly fastened. The modified reflection reflected by the primary RFID reflective element 122 alone indicates to the monitoring circuit 101 both the unique information identifying the individual tracking structure 121 and an indication that the associated individual lap belt 131 is not properly fastened. The primary RFID reflective element 122 mounts in the first lap belt connector 161 of the seat belt buckle of the individual lap belt 131.

The supplemental RFID reflective element 123 is a passive electrical structure. The supplemental RFID reflective element 123 mounts in the second lap belt connector 162 of the seat belt buckle of the individual lap belt 131. The supplemental RFID reflective element 123 forms an electrical connection with the primary RFID reflective element 122 when the second lap belt connector 162 attaches to the first lap belt connector 161 such that the individual lap belt 131 is properly fastened.

The electrical connection of the supplemental RFID reflective element 123 to the primary RFID reflective element 122 changes the reflective characteristics of the individual tracking structure 121 such that the modified reflection reflected by the individual tracking structure 121 is changed. The changed modified reflection reflected by the combined primary RFID reflective element 122 and the supplemental RFID reflective element 123 indicates to the monitoring circuit 101 both the unique information identifying the individual tracking structure 121 and an indication that the associated individual lap belt 131 is properly fastened.

The electrical connector 124 is the physical device that forms the electrical connection between the primary RFID reflective element 122 and the supplemental RFID reflective element 123 when the individual lap belt 131 is properly fastened. The electrical connector 124 mounts in both the first lap belt connector 161 and the second lap belt connector 162 such that the primary RFID reflective element 122 is electrically connected to the supplemental RFID reflective element 123 when the individual lap belt 131 is properly fastened.

The following definitions were used in this disclosure:

Aircraft: As used in this disclosure, an aircraft is a vehicle that moves through the atmosphere (or a vacuum) without requiring a structural load path to a supporting surface.

Anchor: As used in this disclosure, anchor means to hold an object firmly or securely.

Anchor Point: As used in this disclosure, an anchor point is a location to which a first object can be securely attached to a second object.

Buckle: As used in this disclosure, a buckle is a fastening device that is used for joining a first free end of a strap to a second free end of the same strap or a different strap. A buckle further comprises a first (also called the male) connector that is attached to the first free end and a second (also called the female) connector that is attached to the second free end. The male connector has a pin or other structure that is generally caught by a structure formed in the female connector.

Diode: As used in this disclosure, a diode is a two terminal semiconductor device that allows current flow in only one direction. The two terminals are called the anode and the cathode. Electric current is allowed to pass from the anode to the cathode.

Display: As used in this disclosure, a display is a surface upon which is presented an image, potentially including, but not limited to, graphic images and text, that is interpretable by an individual viewing the projected image in a meaningful manner. A display device refers to an electrical device used to present these images.

Independent: As used in this disclosure, the term independent refers to the relationship between the operation and control of a first device and a second device. The first device and the second device are independent from each other if: a) the operation of the first device is neither impacted nor influenced by the operation of the second device; and, b) the operation of the second device is neither impacted nor influenced by the operation of the first device.

Instantiation: As used in this disclosure, an instantiation refers to a specific physical object or process that is created using a specification.

Harness: As used in this disclosure, a harness is an apparatus comprising a plurality of straps and one or more fasteners that is used to fasten or anchor a first person or first object to a second object. The phrase N point harness refers to the installation of the harness wherein the harness has N anchor points. For example, a 2 point harness has two anchor points while a 5 point harness has 5 anchor points.

Latch: As used in this disclosure, a latch is a fastening or locking mechanism. The use of the term latch does not necessarily but often implies the insertion of an object into a notch or cavity.

LED: As used in this disclosure, an LED is an acronym for a light emitting diode. A light emitting diode is a diode that is also a light source.

Limit Resistor: As used in this disclosure, a limit resistor is an electrical resistor that is used to limit the flow of electric current through an electrical circuit.

Logic Module: As used in this disclosure, a logic module is a readily and commercially available electrical device that accepts digital and analog inputs, processes the digital and analog inputs according to previously specified logical processes and provides the results of these previously specified logical processes as digital or analog outputs. The disclosure allows, but does not assume, that the logic module is programmable.

Passenger: As used in this disclosure, a passenger is an individual that is transported by a vehicle.

Passive and Active Electric Circuit: As used in this disclosure, a passive electric circuit is an electric circuit that does not perform an amplification, oscillation, or switching function. The functions of a passive electric circuit are generally limited to: a) absorbing and dissipating electric energy; b) storing electric energy; and, c) transferring electric energy. A passive electric circuit can change the amplitude but not the frequency of an input signal. Examples of circuit elements used to form passive electric circuits include, but are not limited to, resistors, capacitors, inductors (including diodes), and diodes. An active circuit refers to an electric circuit that performs amplification, oscillation, and switching functions. Examples of circuit elements used to form active electric circuits include, but are not limited to, operational amplifiers, oscillators, transistors, and logic circuit elements such as logic gates.

Quick Release Buckle: As used in this disclosure, a quick release buckle refers to a buckle system that can be unfastened using a single hand.

Resistance: As used in this disclosure, resistance refers to the opposition provided by an electrical circuit (or circuit element) to the electrical current created by a DC voltage is presented across the electrical circuit (or circuit element). The term impedance is often used for resistance when referring to an AC voltage that is presented across the electrical circuit (or circuit element).

Resistor: As used in this disclosure, a resistor is a well-known and commonly available electrical device that presents a resistance that inhibits the flow of electricity through an electric circuit. Within an electric circuit processing alternating currents, the resistor will not affect the phase of the alternating current. A current flowing through a resistor will create a voltage across the terminals of the resistor.

RFID: As used in this disclosure, RFID refers to Radio Frequency Identification technology. RFID is a wireless technology that uses an electromagnetic field to identify and retrieve data from tracking tags that are placed on or near an object.

RFID Interrogator: As used in this disclosure, an RFID interrogator is a device that transmits a radio signal at frequency designed to activate RFID tracking tags that are tuned to operate at that frequency; b) receives a modified reflected signal from each of the RFID tracking tags that were activated by the transmitted radio signal; c) decodes the information contained in the received modified reflected signal for each of the activated RFID tracking tag; and, d) forwards the decoded information to a designated device or process for subsequent processing.

RFID Tracking Tag: As used in this disclosure, an RFID tracking tag is a reflective antenna that receives a radio signal from an RFID Interrogator and uses the energy received from the RFID interrogator signal to reflect a modified signal back to the RFID interrogator. The modified signal generally contains identification information about the RFID tag. The RFID interrogator receives and records these reflected signals. RFID tags are generally tuned to respond to a specific frequency. The RFID tracking tag as described to this point is a passive, or unpowered RFID tracking tag. There are also available within RFID technology active, or powered, RFID tracking tags. An active RFID tracking tag acts as a beacon that actively transmits identification information in a manner that can be received and recorded by an RFID interrogator. Within this disclosure, both passive and active RFID tracking tags are used.

Seat: As used in this disclosure, a seat is a structure that a person can sit on. Chair is a common synonym for a seat.

Seat Belt: As used in this disclosure, a seat belt refers to one of two harness systems that are used to secure a person into a fixed position within a vehicle. The harness structures of a seatbelt are selected from the group consisting of: a) a two point harness; and, b) a three point harness. A seat belt using a two point harness is called a lap belt. The lap belt is worn around the waist of the person wearing the lap belt. The strap of the lap belt is secured to the two anchor points using a seat belt buckle. A seat belt using a three point harness is a lap belt that adds a third anchor point to the lap belt that is located above the shoulder of the person wearing the seat belt. The third anchor point secures a strap, known as the shoulder strap, across the torso of the person wearing the seatbelt. The shoulder strap is anchored from the third anchor point to one of the two anchor points used to form the lap belt. The shoulder strap in a land vehicle, such as an automobile, will typically be secured to the lap belt by attaching to the seat buckle.

Such As: As used in this disclosure, the term "such as" is a conjunction that relates a first phrase to a subsequent phrase. The term "such as" is used to introduce representative examples of structures that meet the requirements of the first phrase. As a first example of the use of the term "such as," the phrase: "the first textile attaches to the second textile using a fastener such as a hook and loop fastener" is taken to mean that a hook and loop fastener is suitable to use as the fastener but is not meant to exclude the use of a zipper or a sewn seam. As a second example of the use of the term "such as," the phrase: "the chemical substance is a halogen such as chlorine or bromine" is taken to mean that either chlorine or bromine are suitable for use as the halogen but is not meant to exclude the use of fluorine or iodine.

Such That: As used in this disclosure, the term "such that" is a conjunction that relates a first phrase to a subsequent phrase. The term "such that" is used to place a further limitation or requirement to the first phrase. As a first example of the use of the term "such that," the phrase: "the door attaches to the wall such that the door rotates relative to the wall" requires that the attachment of the door allows for this rotation. As a second example of the use of the term "such that," the phrase: "the chemical substance is selected such that the chemical substance is soluble in water" requires that the selected chemical substance is soluble in water. As a third example of the use of the term "such that," the phrase: "the lamp circuit is constructed such that the lamp circuit illuminates when the lamp circuit detects darkness" requires that the lamp circuit: a) detect the darkness; and, b) generate the illumination when the darkness is detected.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy.

Visible: As used in this disclosure, the term visible refers to the ability of an individual (referred to as a viewer) to see an object. The term visible implies that the direct "line of sight" between a viewer and the object does not have any opaque or semitransparent barriers between the viewer and the object that would inhibit the transmission of electromagnetic radiation between the viewer and the object. The term visibility is used to mean that an object is visible from the position of a viewer.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A seat belt indication system comprising
a monitoring circuit, a plurality of tracking structures, a plurality of lap belts, and a plurality of vehicle seats;
wherein each of the plurality of lap belts attaches to a vehicle seat selected from the plurality of vehicle seats;
wherein each of the plurality of tracking structures mounts in the plurality of lap belts;
wherein the monitoring circuit forms a communication link with the plurality of tracking structure; the monitoring circuit forms an interrogation communication link with each of the plurality of tracking structures;
wherein the monitoring circuit transmits an interrogation signal using the interrogation communication link to each of the plurality of tracking structures;
wherein the monitoring circuit receives a response to the interrogation signal from each of the plurality of tracking structures over the interrogation communication link;
wherein the monitoring circuit determines the status of each of the individual tracking structure selected from the plurality of tracking structures from the response to the interrogation signal received from each individual tracking structure;
wherein a logic module visibly displays the fastening status of each individual tracking structure selected from the plurality of tracking structures using a plurality of signaling LEDs.

2. The seat belt indication system according to claim 1
wherein the seat belt indication system is an alarm system;
wherein the plurality of vehicle seats comprises a collection of individual vehicle seats;
wherein the individual vehicle seat is a seat that is mounted in a fixed position within a vehicle;
wherein each of the plurality of vehicle seats is adapted to allow a passenger of the vehicle to sit within the vehicle;
wherein there is a one to one correspondence between the plurality of vehicle seats and the plurality of lap belts such that an individual lap belt selected from the plurality of lap belts attaches to an individual vehicle seat selected from the plurality of vehicle seats.

3. The seat belt indication system according to claim 2
wherein the plurality of lap belts comprises a collection of individual lap belts;
wherein each individual lap belt selected from the plurality of lap belts attaches to an individual vehicle seat selected from the plurality of vehicle seats;
wherein there is a one to one correspondence between each individual vehicle seat selected from the plurality of vehicle seats and each individual lap belt selected from the plurality of lap belts;
wherein each individual lap belt forms a harness that secures a passenger into the individual vehicle seat selected from the plurality of vehicle seats that is associated with the individual lap belt;
wherein each of the plurality of tracking structures attaches to an individual lap belt selected from the plurality of lap belts;
wherein there is a one to one correspondence between the plurality of tracking structures and the plurality of lap belts;
wherein each individual lap belt comprises a first lap belt connector and a second lap belt connector;
wherein the first lap belt connector is a first connector of a seat belt buckle of the individual lap belt;
wherein the second lap belt connector is a second connector of the seat belt buckle of the individual lap belt;
wherein the first lap belt connector is fastened to the second lap belt connector to properly fasten the individual lap belt;
wherein by properly fastening the individual lap belt is meant that a passenger is properly secured to the individual vehicle seat.

4. The seat belt indication system according to claim 3
wherein each individual tracking structure selected from the plurality of tracking structures attaches to an individual lap belt selected from the plurality of lap belts such that the selected individual tracking structure monitors the status of the individual lap belt;
wherein the status of the individual lap belt is selected from the group consisting of: a) the individual lap belt is properly fastened; and, b) the individual lap belt is not properly fastened.

5. The seat belt indication system according to claim 4
wherein the monitoring circuit monitors each of the plurality of tracking structures to individually determine the status of each individual lap belt;
wherein the monitoring circuit provides a visual display of the status of each individual lap belt;
wherein each of the plurality of vehicle seats is a seat that is mounted in a vehicle.

6. The seat belt indication system according to claim 5
wherein each of the plurality of tracking structures is a passive electric circuit;
wherein there is a one to one correspondence between each individual tracking structure selected from the plurality of tracking structures and each individual lap belt selected from the plurality of lap belts;
wherein each individual tracking structure selected from the plurality of tracking structures mounts into the associated individual lap belt selected from the plurality of lap belts;
wherein each of the plurality of tracking structures forms an RFID tracking tag;
wherein each of the plurality of tracking structures generates a modified reflection of the interrogation signal generated by the monitoring circuit;
wherein the modified reflection of the interrogation signal that is returned by each plurality of tracking structures of the individual tracking structure to the monitoring circuit uniquely identifies the individual tracking structure;
wherein the modified reflection of the interrogation signal that is returned by each plurality of tracking structures of the individual tracking structure to the monitoring circuit transmits the fastening status of the associated individual lap belt to the monitoring circuit;
wherein the plurality of tracking structures comprises a collection of individual tracking structure;
wherein the individual tracking structure is a passive RFID tracking tag;
wherein the individual tracking structure reflects a modified reflection of the interrogation signal received from the monitoring circuit back to the monitoring circuit over the interrogation communication link;
wherein the modified reflection that is reflected by the individual tracking structure transmits information that uniquely identifies the individual tracking structure to the RFID interrogator of the monitoring circuit;
wherein the modified reflection that is reflected by the individual tracking structure transmits information regarding the fastening status of the individual lap belt associated with the individual tracking structure;

wherein the individual tracking structure transmits a first modified reflection to the monitoring circuit when the individual lap belt is not properly fastened;

wherein the individual tracking structure transmits a second modified reflection to the monitoring circuit when the individual lap belt is properly fastened.

7. The seat belt indication system according to claim 6 wherein the monitoring circuit comprises a logic module, an RFID interrogator, and a plurality of signaling LEDs;

wherein the logic module, the RFID interrogator, and the plurality of signaling LEDs are electrically interconnected.

8. The seat belt indication system according to claim 7 wherein each individual tracking structure selected from the plurality of tracking structures comprises a primary RFID reflective element, a supplemental RFID reflective element, and an electrical connector;

wherein the electrical connector electrically connects the primary RFID reflective element to the supplemental RFID reflective element.

9. The seat belt indication system according to claim 8 wherein the logic module is a programmable electric circuit;

wherein the logic module controls the operation of the RFID interrogator;

wherein the logic module monitors the interrogation signal responses received by the RFID interrogator from each of the plurality of tracking structures to determine the fastening status of each individual tracking structure;

wherein the logic module individually controls the illumination of each LED selected from the plurality of signaling LEDs.

10. The seat belt indication system according to claim 9 wherein the RFID interrogator is an electric circuit;

wherein the RFID interrogator further comprises an interrogation communication link;

wherein the interrogation communication link refers to the set of radio frequency communications that occur between the plurality of lap belts and the monitoring circuit;

wherein the interrogation communication link includes the transmission of the interrogation signal from the monitoring circuit to the plurality of tracking structures;

wherein the interrogation communication link further includes the reflection of the interrogation signal, in the form of the modified reflection, from each individual tracking structure selected from the plurality of tracking structures back to the monitoring circuit;

wherein the RFID interrogator transmits a radio frequency interrogation signal to each individual tracking structure selected from the plurality of tracking structures;

wherein the RFID interrogator receives the modified reflection of the transmitted interrogation signal from each of the individual tracking structures;

wherein the RFID interrogator extracts the identification information from the modified reflection received from each individual tracking structure;

wherein the RFID interrogator extracts from the modified reflection received from each individual tracking structure the fastening status of the individual lap belt associated with the individual tracking structure;

wherein the RFID interrogator forwards the extracted identification information and the extracted fastening status received from each individual tracking structure to the logic module for further processing;

wherein the logic module uses the extracted identification information and the extracted fastening status received from each individual tracking structure to determine the status of each LED contained in the plurality of signaling LEDs.

11. The seat belt indication system according to claim 10 wherein each of the plurality of signaling LEDs is an LED;

wherein the operation of each signaling LED selected from the plurality of signaling LEDs is independently controlled by the logic module;

wherein the plurality of signaling LEDs displays the status of each individual tracking structure selected from the plurality of tracking structures;

wherein for each individual tracking structure selected from the plurality of tracking structures, the plurality of signaling LEDs generates a first visible illumination that is uniquely identified with the selected individual tracking structure indicating that the selected individual lap belt is not properly fastened;

wherein for each plurality of signaling LEDs selected from the plurality of tracking structures, the plurality of signaling LEDs generates a second visible illumination that is uniquely identified with the selected individual tracking structure indicating that the selected individual lap belt is properly fastened.

12. The seat belt indication system according to claim 11 wherein the primary RFID reflective element forms a primary RFID tracking tag that can operate independently of the supplemental RFID reflective element;

wherein the primary RFID reflective element is a passive electric structure;

wherein the primary RFID reflective element generates a modified reflection of the interrogation signal generated by individual tracking structure that is independent of the supplemental RFID reflective element when the individual lap belt is not properly fastened;

wherein the modified reflection reflected by the primary RFID reflective element alone indicates to the monitoring circuit both the unique information identifying the individual tracking structure and an indication that the associated individual lap belt is not properly fastened;

wherein the primary RFID reflective element mounts in the first lap belt connector of the seat belt buckle of the individual lap belt.

13. The seat belt indication system according to claim 12 wherein the supplemental RFID reflective element is a passive electrical structure;

wherein the supplemental RFID reflective element mounts in the second lap belt connector of the seat belt buckle of the individual lap belt;

wherein the supplemental RFID reflective element forms an electrical connection with the primary RFID reflective element when the second lap belt connector attaches to the first lap belt connector such that the individual lap belt is properly fastened;

wherein the electrical connection of the supplemental RFID reflective element to the primary RFID reflective element changes the reflective characteristics of the individual tracking structure such that the modified reflection reflected by the individual tracking structure is changed;

wherein the changed modified reflection reflected by the combined primary RFID reflective element and the supplemental RFID reflective element indicates to the monitoring circuit both the unique information identifying the individual tracking structure and an indication that the associated individual lap belt is properly fastened;

wherein the electrical connector is the physical device that forms the electrical connection between the primary RFID reflective element and the supplemental RFID reflective element when the individual lap belt is properly fastened;

wherein the electrical connector mounts in both the first lap belt connector and the second lap belt connector such that the primary RFID reflective element is electrically connected to the supplemental RFID reflective element when the individual lap belt is properly fastened.

* * * * *